(12) United States Patent
Walker et al.

(10) Patent No.: US 9,469,137 B2
(45) Date of Patent: Oct. 18, 2016

(54) OPTIMIZATION OF DRYING FOR WET COLORANTS IN A PRINTING SYSTEM

(71) Applicants: Casey E. Walker, Boulder, CO (US);
Scott R. Johnson, Erie, CO (US);
Stuart J. Boland, Denver, CO (US);
William Edward Manchester, Erie, CO (US); David M. Price, Loveland, CO (US)

(72) Inventors: Casey E. Walker, Boulder, CO (US);
Scott R. Johnson, Erie, CO (US);
Stuart J. Boland, Denver, CO (US);
William Edward Manchester, Erie, CO (US); David M. Price, Loveland, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/921,823

(22) Filed: Oct. 23, 2015

(65) Prior Publication Data
US 2016/0039235 A1 Feb. 11, 2016

Related U.S. Application Data

(63) Continuation of application No. 14/571,043, filed on Dec. 15, 2014, now Pat. No. 9,199,485, which is a continuation of application No. 13/760,428, filed on Feb. 6, 2013, now Pat. No. 8,939,541.

(51) Int. Cl.
*B41J 29/393* (2006.01)
*B41J 11/00* (2006.01)
*H04N 1/60* (2006.01)

(52) U.S. Cl.
CPC .............. *B41J 29/393* (2013.01); *B41J 11/002* (2013.01); *B41J 11/0015* (2013.01); *H04N 1/605* (2013.01); *B41J 2029/3935* (2013.01)

(58) Field of Classification Search
None
See application file for complete search history.

(56) References Cited

U.S. PATENT DOCUMENTS

2009/0315963 A1* 12/2009 Sakata .................. B41J 11/002
347/102

* cited by examiner

*Primary Examiner* — An Do
*Assistant Examiner* — Renee I Wilson
(74) *Attorney, Agent, or Firm* — Duft Bornsen & Fettig LLP

(57) ABSTRACT

Systems and methods are disclosed for determining an operational range of colorant densities and heating powers that result in successful drying for a print media that is based on a drying quality of test images printed by a printing system. One embodiment comprises a printing system that applies colorant onto a continuous-form medium and applies heat to the medium based on a heating power. The printing system prints a plurality of test images onto the medium, where one or more of a colorant density and a heating power vary for each of the printed test images. The printing system determines a drying quality for the printed test images, and calculates an operational range of colorant densities and heating powers for the medium based on the drying quality of the printed test images.

30 Claims, 5 Drawing Sheets

OPTIMIZATION OF DRYING FOR WET COLORANTS IN A PRINTING SYSTEM

CROSS-REFERENCE TO RELATED APPLICATIONS

This patent application is a continuation of U.S. patent application Ser. No. 14/571,043 filed on Dec. 15, 2014 and entitled OPTIMIZATION OF DRYING FOR WET COLORANTS IN A PRINTING SYSTEM, which is a continuation of U.S. patent application Ser. No. 13/760,428 filed on Feb. 6, 2013 and entitled OPTIMIZATION OF DRYING FOR WET COLORANTS IN A PRINTING SYSTEM, all of which are hereby incorporated by reference in their entirety.

FIELD OF THE INVENTION

The invention relates to the field of printing systems.

BACKGROUND

Businesses or other entities having a need for volume printing typically purchase a production printer. A production printer is a high-speed printer used for volume printing, such as 100 pages per minute or more. The production printers are typically continuous-form printers that print on paper or some other printable medium that is stored on large rolls.

A production printer typically includes a localized print controller that controls the overall operation of the printing system, a print engine (sometimes referred to as an "imaging engine" or as a "marking engine"), and a drier. The print engine includes one or more printhead assemblies, with each assembly including a printhead controller and a printhead (or array of printheads). An individual printhead includes multiple tiny nozzles (e.g., 360 nozzles per printhead depending on resolution) that are operable to discharge colorants as controlled by the printhead controller. The printhead array is formed from multiple printheads that are spaced in series along a particular width so that printing may occur across the width of the medium. Printhead arrays can also consist of multiple heads marking the same location on the medium with different colorants. The drier is used to heat the medium to dry the colorant(s).

In dryers that apply a great deal of heat over a short period of time, it remains a problem to ensure that the medium is properly dried. Too much heat can cause the medium to char or burn. At the same time, too little heat can result in the colorant on the medium remaining wet, resulting in smearing or offsetting that reduces the print quality of jobs. Further, different combinations of colorants and print medium materials require different amounts of heating to achieve adequate drying without burning. Thus, a print operator (or the printer manufacturer) often spends a considerable amount of time characterizing a combination of print media and colorant at a printing system.

Thus, printing system operators continue to desire printing systems with enhanced functionality.

SUMMARY

Embodiments described herein determine an operational range of colorant densities and heating powers that result in successful drying for a print media. Various combinations of colorant and print media may dry differently in a printing system. Different colorants and/or media may absorb radiated energy differently, which modifies the ranges of colorant densities and heating powers that result in successful drying. For example, some colorants may remain wet at high densities regardless of the heating power applied to dry the media, which is undesirable. Further, colorants may be over-dried for some heating powers, which may cause burning or charring of the media. This is also undesirable.

One embodiment is an apparatus comprising a control system implemented in a printing system, where the printing system includes a print engine that is operable to apply a colorant onto a continuous-form medium, and further includes a radiant dryer that is operable to apply heat to the medium based on a heating power. The control system is operable to direct the print engine to print a plurality of test images onto the medium, and to vary at least one of a heating power and a colorant density for the printed test images. The control system is further operable to determine a drying quality for each of the printed test images, and to calculate an operational range of colorant densities and heating powers for the medium based on the drying quality of the printed test images.

Another embodiment is a method implemented in a printing system, where the printing system includes a print engine that is operable to apply a colorant onto a continuous-form medium, and further includes a radiant drier that is operable to apply heat to the medium based on a heating power. The method comprises directing the print engine to print a plurality of test images onto the medium. The method further comprises varying at least one of the heating power and a colorant density for each of the printed test images. The method further comprises determining a drying quality for the printed test images. The method further comprises calculating an operational range of colorant densities and heating powers for the medium based on the drying quality for the printed test images.

Another embodiment is a non-transitory computer readable medium. The medium embodies programmed instructions executable by a processor of a printing system, where the printing system includes a print engine that is operable to apply a colorant onto a continuous-form medium, and further includes a radiant drier that is operable to apply heat to the medium based on a heating power, the instructions direct the processor to direct the print engine to print a plurality of test images onto the medium. The instructions further direct the processor to vary at least one of the heating power and a colorant density for each of the printed test images. The instructions further direct the processor to determine a drying quality for the printed test images. The instructions further direct the processor to calculate an operational range of colorant densities and heating powers for the medium based on the drying quality for the printed test images.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
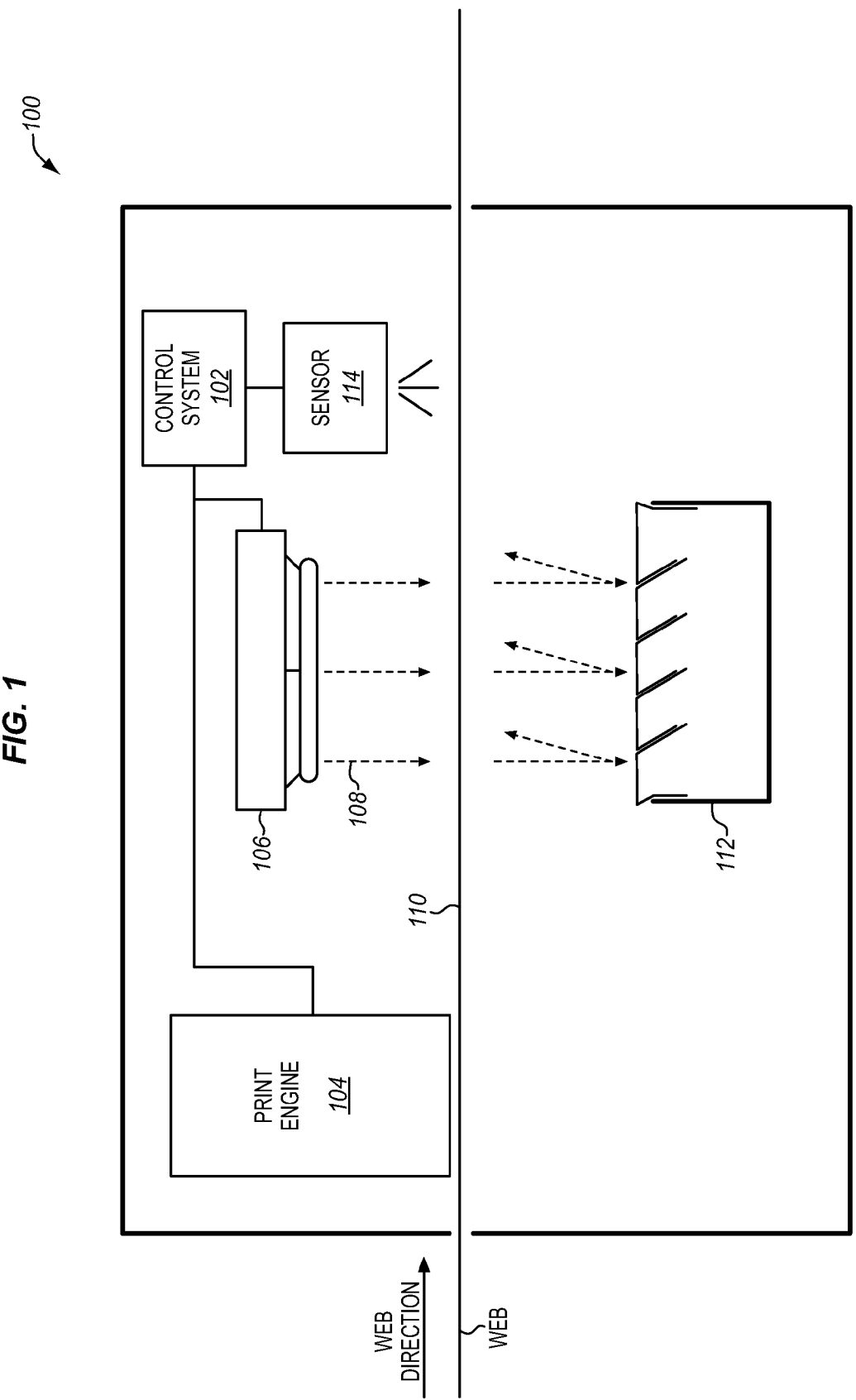
FIG. 1 is a block diagram of a printing system in an exemplary embodiment.

FIG. 1 is a block diagram of a printing system 100 in an exemplary embodiment. In this embodiment, printing system 100 includes a control system 102, a radiant dryer 106, a reflector 112, a sensor 114, and a print engine 104. A web of print media 110 traverses a media path through printing system 100 in the direction indicated by the arrow in FIG. 1. During the printing process, media 110 travels along the media path proximate to print engine 104 for marking with a wet colorant, such as aqueous inks. Media 110, now wet with the colorant, continues along the media path and has heat applied by radiant dryer 106 via radiant energy 108. After heat is applied to media 110 by radiant dryer 106, media 110 continues along the media path past sensor 114, which captures image data of media 110, including any printed images applied thereof.

One problem with printing systems is that a large number of combinations of print media and colorants may be utilized in printing different jobs. Such variations in print media and colorants may result in variations in the operational ranges for colorant densities and heating powers that may be successfully dried for a print media by a printing system, such as printing system 100. For example, some colorant and media combinations may absorb more radiated energy from radiant dryer 106 than others during the printing process, resulting in localized burning or charring of media 110 proximate to the applied colorant as media 110 exits radiant dryer 106. Burning or charring of media 110 is undesirable, as this reduces the quality of the printed output of printing system 100. Other colorant and media combinations may absorb less radiated energy from radiant dryer 106 than others during the printing process, resulting in the applied colorant remaining wet as media 110 exits radiant dryer 106. A wet colorant may smear or generate printing offsets on media 110 due to rollers or other media handling systems that are within radiant dryer 106 or downstream of radiant dryer 106. Smearing and printing offsets on media 110 are also undesirable, as they reduce the quality of the printed output of printing system 100.

In prior printing systems, a print operator (or the manufacturer) was tasked with determining the operational ranges of colorant densities and heating powers that may be successfully dried for a print media. However, this involves much operator skill and trial and error. Further, given the large possible combinations of print media and colorants, it may be nearly impossible to correctly determine this information completely for all combinations. This may result in much wasted operator time and resources when printing jobs on a combination of colorant and print media that are incompletely characterized.

In this embodiment, printing system 100 automatically calculates a range of colorant densities and heating powers that results in successful drying for a print media, such as print media 110. Broadly speaking, control system 102 includes any system, component, or device that is operable to calculate or determine a range of colorant densities and heating powers that can be utilized or result in successful drying for a printable media. Control system 102 may direct print engine 104 to vary the colorant densities for each of the test images, and/or may vary a heating applied by radiant dryer 106 to the test images. Sensor 114, which may include colorimetric equipment; such as a spectrophotometer, a densitometer, a camera, or some other type of spectral measuring device, captures data regarding media 110, the test images, or some combination thereof for analysis by controller 102. Although only one sensor 114 is illustrated in FIG. 1, one skilled in the art will recognize that multiple sensors may be placed downstream of radiant dryer 106 to capture data of the marked side of media 110, the side opposite the marked side of media 110, or some combination thereof.

Figure 2:
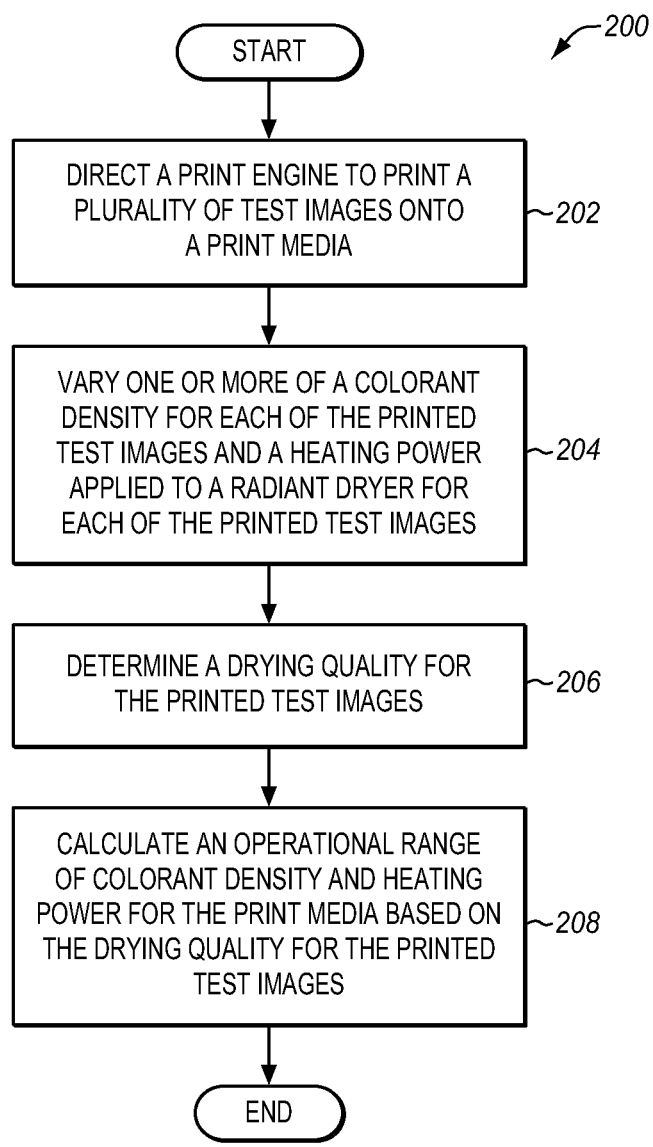
FIG. 2 is a flowchart illustrating a method for determining an operational range of colorant densities and heating powers that result in successful drying of a print media in an exemplary embodiment.

Consider the case whereby a print operator desires to characterize a range of colorant densities and heating powers that result in successful drying for print media 110. This characterization may be performed in cases whereby a new print media and/or colorant is loaded at printing system 100. FIG. 2 illustrates a method 200 of determining an operational range of colorant densities and heating powers that result in successful drying for a print media in an exemplary embodiment. The steps of method 200 are described with reference to printing system 100 of FIG. 1, but those skilled in the art will appreciate that method 200 may be performed in other systems. The steps of the flowchart(s) described herein are not all inclusive and may include other steps not shown. The steps described herein may also be performed in an alternative order.

In step 202, control system 102 directs print engine 104 to print a plurality of test images onto media 110 (see FIG. 1). The test images may comprise various patterns, shapes, etc., created specifically to enable printing system 100 to recognize smearing, burning, offsetting, etcetera that may be present in the printed images after they are subjected to a heating process by radiant dryer 106. Also, various colorants may absorb the radiated energy from radiant dryer 106 differently. Some colorants may evaporate at a faster rate for the same heating power applied to radiant dryer 106 than other colorants. Also, combinations of colorants may absorb the radiated energy from radiant dryer 106 differently than the colorants the combination is composed of. The test images may be printed in an order which allows for correlation to colors used in a printed application such as a development of an ICC profile. For a specific print system/media combination the combination of colors and the associated drying levels would be able to define the maximum color "gamut" and the associated heating power level.

In step 204, control system 102 varies one or more of a colorant density for each of the printed test images and a heating power applied to radiant dryer 106 for each of the printed test images. When varying the colorant density for each of the printed test images, control system 102 may direct print engine 104 to print test images within a range of colorant densities, such as between 0% and 100%, while applying a constant heating power to radiant dryer 106. For example, if 50 test images are printed, then the colorant density may vary between each of the images by 2% such that a relationship between a varying colorant density and a fixed heating power can be evaluated. After printing, media 110 travels past radiant dryer 106, which applies heat to media 110 based on the constant heating power.

When varying a heating power applied to radiant dryer 106 for each of the printed test images, control system 102 may direct print engine to print test images having a constant colorant density. After printing, media 110 travels past radiant dryer 106, which applies heat to media 110 based on a varying heating power for each of the printed test images. For example, if 50 test images are printed with a colorant density of 25%, then the heating power applied to radiant dryer 106 may vary for each printed test images within a range of values such that a relationship between a fixed colorant density and a varying heating power (e.g., a heating power that varies between 10% and 90% across the plurality of printed test images) may be evaluated.

In some cases, both the colorant density and the heating power may vary for each of the printed test images. For example, multiple test images may be printed along a range of colorant densities, while a heating power applied to radiant dryer 106 varies as well. This may be useful when evaluating various combinations of colorant densities and heating powers in a more "shotgun" approach. This may also allow the print operator to more quickly locate some combination of colorant density and heating power that may be successfully dried on media 110 by printing system 100, thus reducing the ranges of colorant densities and heating powers that remain for evaluation.

In step 206, control system 102 determines a drying quality for the printed test images. For example, control system 102 may receive data from sensor 114 to determine the drying quality. After the printed test images are heated by radiant dryer 106, the printed test images travel along with media 110 past sensor 114. Sensor 114 may capture image data for the printed test images. Control system 102 may then compare the image data with reference data for the printed test images. The reference data may be related to or the same as the print data utilized by print engine 104 when marking media 110. Thus, the reference data may give an indication of how the printed test images are ideally printed by printing system 100. In some cases, the result of the printed test images is not ideal. For example, if too little heat is applied by radiant dryer 106 during the drying process, then a printed test image may remain wet. In other words, with aqueous inks, some water remains on media 110 that has not evaporated. Smearing or offsetting may occur when the printed test image remain wet. For instance, media feed rollers (not shown in FIG. 1) may smear or carry the wet ink to other locations on media 110, thus indicating that the printed test image is under-dry. If too much heat is applied by radiant dryer 106, then the printed test image may be over-dry. This may result in localized heating of media 110 by the dry colorant, which may cause burning or charring of media 110. If the printed test image is over-dry, then a color change may occur in media 110, which may be detected by control system 102. This color change may be more noticeable on the back side or opposite side of media 110 than the colorant is applied to.

Figure 3:
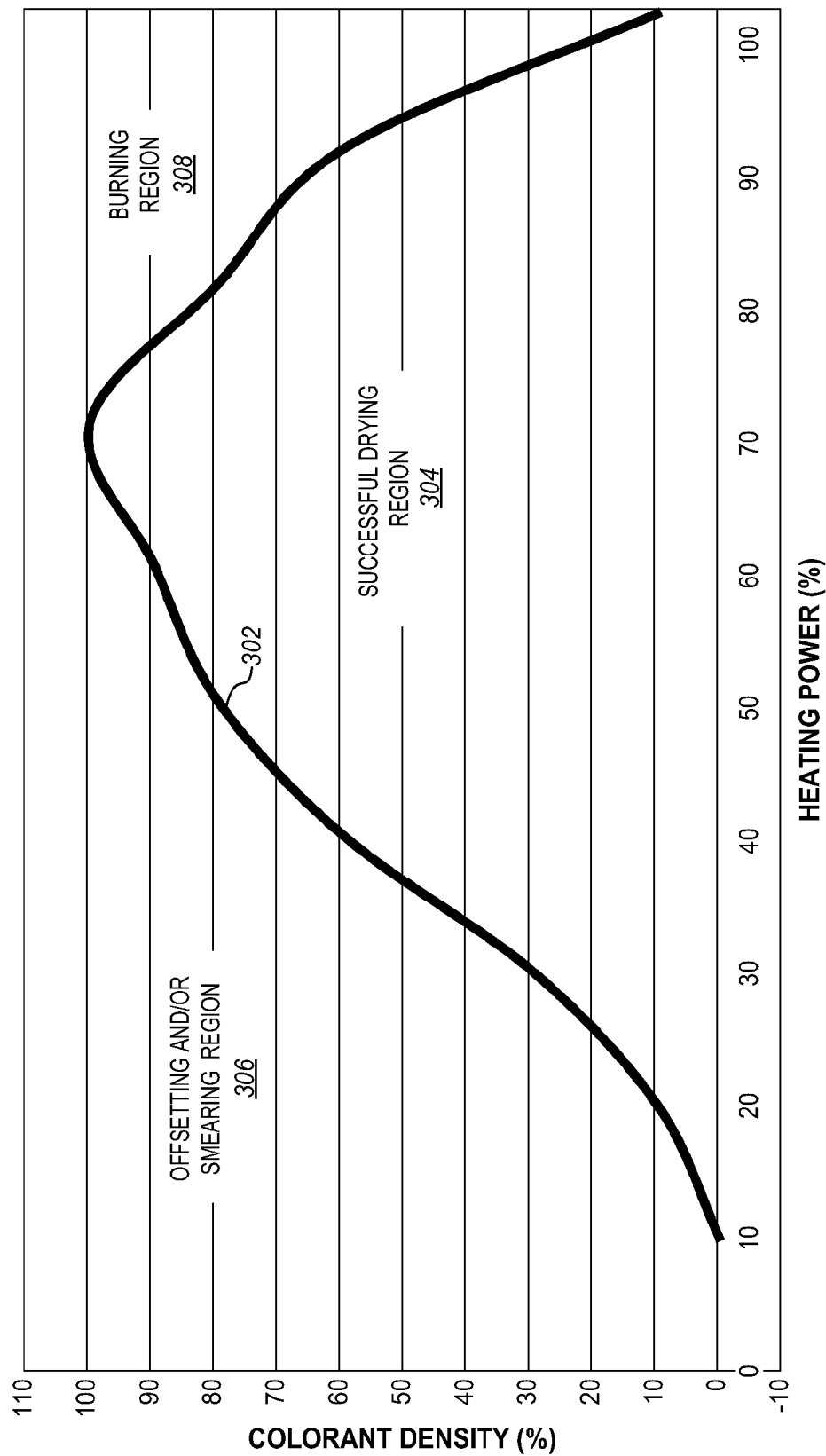
FIG. 3 is a block diagram illustrating the drying results for a colorant at the printing system of FIG. 1 in an exemplary embodiment.

In step 208, control system 102 calculates an operational range of colorant densities and heating powers for media 110 that are based on the drying quality for the printed test images. As discussed above, in some cases a printed test image may indicate that a particular combination of colorant density and heating power remains wet, is dry, or is over-dry. Control system 102 records information for the printed test images to allow a profile or range of "acceptable" or "adequate" drying to be determined for a particular colorant/media combination under test at printing system 100. One example of a drying profile for a colorant is illustrated in FIG. 3. FIG. 3 illustrates the drying results for a colorant 302 at printing system 100 in an exemplary embodiment. The region under the curve of colorant 302 is the successful drying region 304. This region indicates an acceptable amount of drying for colorant 302, as determined by control system 102. Printed test images having a colorant/heating power combination within region 304 may exhibit little or no burning, offsetting, or smearing during testing. For instance, region 304 indicates that colorant 302 is successfully dried at a colorant density of 50% when the heating power applied to radiant dryer 106 varies from between about 38% to 90%.

The region to the left of the curve for colorant 302 is the offset/smearing region 306. Region 306 indicates an unacceptable amount of drying for colorant 302, as determined by control system 102. Printed test images having a colorant/heating power combination within region 306 indicate offsetting and/or smearing during testing, which is representative of a colorant that remains wet after heat is applied by radiant dryer 106. For instance, region 306 indicates that colorant 302 remains wet at a colorant density of 50% when the heating power applied to radiant dryer 106 varies from between about 10% to 38%.

The region to the right of the curve for colorant 302 is a burning region 308. Region 308 indicates an unacceptable amount of drying for colorant 302, as determined by control system 102. Printed test images having a colorant/heating power combination within region 308 indicate burning or charring during testing, which is representative of a colorant that is over-dry after heat is applied by radiant dryer 106. For instance, region 308 indicates that colorant 302 is over-dry at a colorant density of 50% when the heating power applied to radiant dryer 106 varies from between about 90% to 100%.

Figure 4:
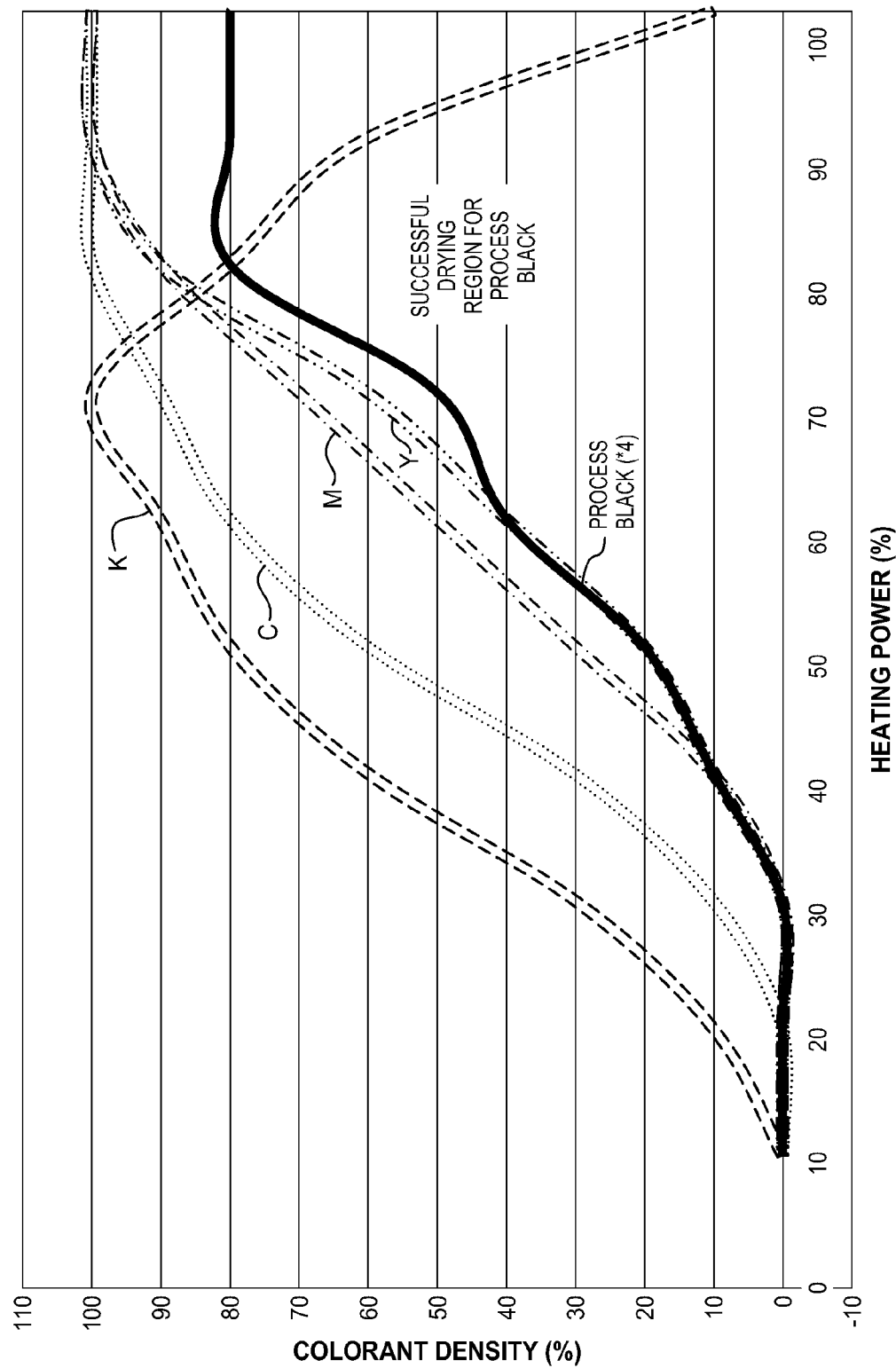
FIG. 4 is a block diagram illustrating the drying results for CMYK colorants at the printing system of FIG. 1 in an exemplary embodiment.

In commercial printing, a print operator often desires information regarding how much colorant can be applied to a print media and still be successfully dried. For instance, in a CMYK color model printing system, Cyan, Magenta, Yellow, and Key (black) are used to represent colors in the printed output. In some cases, a print job may call for nearly 100% coverage for process black, which is the combination of CMYK colorants applied to a print media. However, rarely can 400% coverage (i.e., 100% coverage for each of CMYK) be successfully dried. Typically, some colorant and heating power limit is present, which depends on the particular characteristics of the colorants and the print media. On example of a drying profile for CMYK colorants is illustrated in FIG. 4. FIG. 4 illustrates the drying results for CMYK colorants at printing system 100 in an exemplary embodiment. Although the individual colorants CMYK may be adequately dried at 100% colorant density, this is not the case for process black. In FIG. 4, the successful drying region for process black is where the area under the K curve and process black curve meet. For instance, at a 50% colorant density for CMYK and a heating power of 50%, process black is adequately and/or successfully dried. However, at a 50% colorant density for CMYK and a heating power of 100%, burning occurs. The ink limit threshold for process black can be determined at the intersection of the K curve and the process black curve. This is about 80% in FIG. 4, which indicates to the print operator that an 80% density for each of CMYK can be successfully dried by printing system 100 for this particular combination of colorants and print media. This type of information is useful when a print operator is attempting to determine what colorant limits, if any, should be communicated to a print customer. For instance, if a customer submits a print job for printing system 100 that has a process black call out in the job of 90%, then the job may be rejected for this particular combination of colorants and media because the job may not be successfully printed by printing system 100. Rather, some other printing system may be utilized for printing the job, or the customer may be asked to choose an alternate combination of colorants and print media for printing the job at printing system 100.

Figure 5:
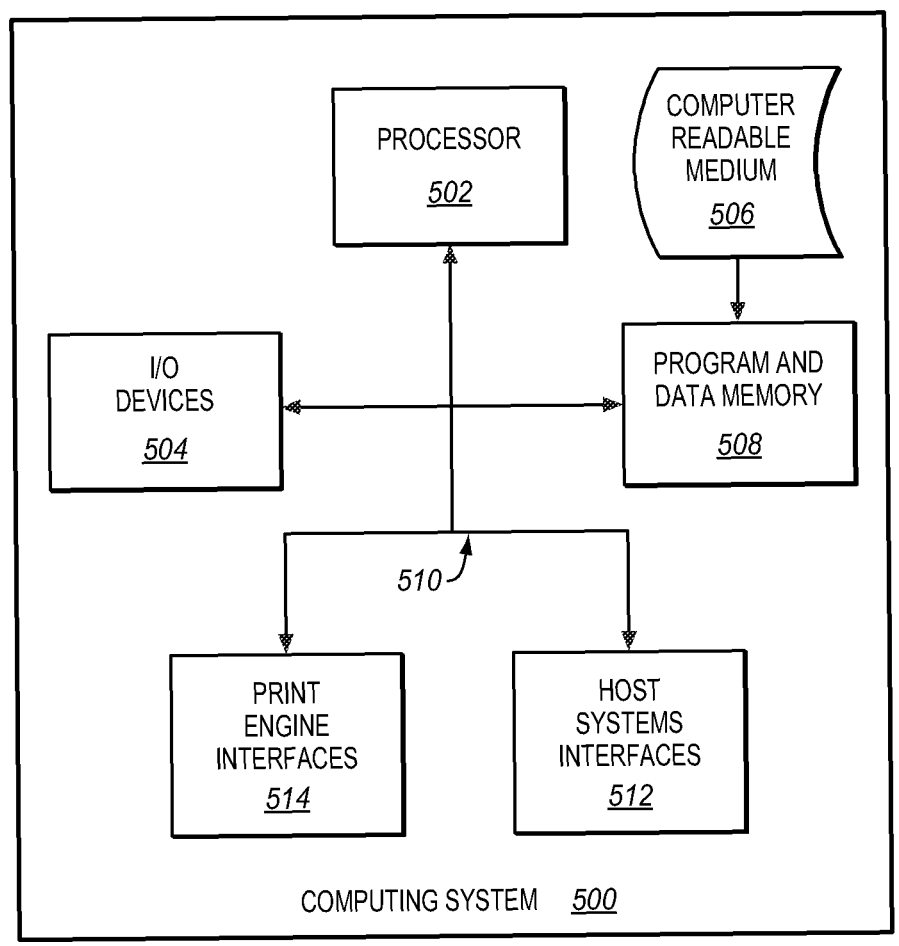
FIG. 5 illustrates a processing system operable to execute a computer readable medium embodying programmed instructions to perform desired functions in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system in which a computer readable medium may provide instructions for performing the method of FIG. 2 in an exemplary embodiment.

Furthermore, the invention can take the form of a computer program product accessible from a computer-usable or computer-readable medium 506 providing program code for use by or in connection with a computer or any instruction execution system. For the purposes of this description, a computer-usable or computer readable medium 506 can be any apparatus that can contain, store, communicate, or transport the program for use by or in connection with the instruction execution system, apparatus, or device.

The medium 506 can be an electronic, magnetic, optical, electromagnetic, infrared, or semiconductor system (or apparatus or device) or a propagation medium. Examples of a computer-readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution.

Input/output or I/O devices 504 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 512, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. An apparatus comprising:
a control system implemented in a printing system, wherein the printing system includes a print engine that is operable to apply colorant onto a continuous-form medium, and includes a radiant dryer that is operable to apply heat to the medium based on a heating power;
the control system operable to direct the print engine to print a plurality of test images onto the medium, and to vary at least one of the heating power and a colorant density for each of the printed test images;
the control system operable to determine whether each of the printed test images remains one of wet, dry, or over-dry subsequent to exiting the radiant dryer.

2. The apparatus of claim 1 wherein:
the control system is operable to calculate an operational range of at least one of colorant densities and heating powers for the medium based on the determination.

3. The apparatus of claim 2 wherein:
the control system is operable to determine a colorant limit for the medium based on the operational range of at least one of the colorant densities and the heating powers for a plurality of colorants utilized in forming a mixture.

4. The apparatus of claim 2 wherein:
the control system is operable to determine a heating power limit for the medium based on the operational range of at least one of the colorant densities and the heating powers for a plurality of colorants utilized in forming a mixture.

5. The apparatus of claim 1 wherein:
the control system is operable to receive data captured from a printed test image, to determine a difference between the data and reference data for the printed test image, and to determine whether the printed test image remains one of wet, dry, or over-dry based on the difference.

6. The apparatus of claim 5 wherein:
the control system is operable to determine that the difference between the data and the reference data indicates at least one of smearing, show-through, and offsetting is present in the printed test image, and to determine that the printed test image remains wet based on the difference.

7. The apparatus of claim 5 wherein:
the control system is operable to determine that the difference between the data and the reference data indicates burning is present in the medium, and to determine that the printed test image is over-dry based on the difference.

8. The apparatus of claim 5 wherein:
the data captured from the printed test image comprises spectral data.

9. The apparatus of claim 1 wherein:
the control system is operable to direct the print engine to print the plurality of test images onto the medium each having a common colorant and a common colorant density, and to vary the heating power for each of the printed test images; and
the control system is operable to determine a heating power limit for the medium at the common colorant density based on the printed test images that remain over-dry subsequent to exiting the radiant dryer.

10. The apparatus of claim 1 wherein:
the control system is operable to direct the print engine to print the plurality of test images onto the medium each having a common colorant and a different colorant density, and to apply a constant heating power to each of the printed test images; and
the control system is operable to determine a colorant density limit for the medium at the constant heating power based on the printed test images that remain wet subsequent to exiting the radiant dryer.

11. A method operable in a printing system, wherein the printing system includes a print engine that is operable to apply a colorant onto a continuous-form medium, and includes a radiant drier that is operable to apply heat to the medium based on a heating power, the method comprising:
directing the print engine to print a plurality of test images onto the medium;
varying at least one of the heating power and a colorant density for each of the printed test images; and
determining whether each of the printed test images remains one of wet, dry, or over-dry subsequent to exiting the radiant dryer.

12. The method of claim 11 further comprising:
calculating an operational range of at least one of colorant densities and heating powers for the medium based on the determination.

13. The method of claim 12 further comprising:
determining a colorant limit for the medium based on the operational range of at least one of the colorant densities and the heating powers for a plurality of colorants utilized in forming a mixture.

14. The method of claim 12 further comprising:
determining a heating power limit for the medium based on the operational range of at least one of the colorant densities and the heating powers for a plurality of colorants utilized in forming a mixture.

15. The method of claim 11 further comprising:
receiving data captured from a printed test image;
determining a difference between the data and reference data for the printed test image; and
determining whether the printed test image remains one of wet, dry, or over-dry based on the difference.

16. The method of claim 15 further comprising:
determining that the difference between the data and the reference data indicates at least one of smearing, show-through, and offsetting is present in the printed test image; and
determining that the printed test image remains wet based on the difference.

17. The method of claim 15 further comprising:
determining that the difference between the data and the reference data indicates burning is present in the medium; and
determining that the printed test image is over-dry based on the difference.

18. The method of claim 15 wherein:
the data captured from the printed test image comprises spectral data.

19. The method of claim 11 further comprising:
directing the print engine to print the plurality of test images onto the medium each having a common colorant and a common colorant density;
varying the heating power for each of the printed test images; and
determining a heating power limit for the medium at the common colorant density based on the printed test images that remain over-dry subsequent to exiting the radiant dryer.

20. The method of claim 11 further comprising:
directing the print engine to print the plurality of test images onto the medium each having a common colorant and a different colorant density;
applying a constant heating power to each of the printed test images; and
determining a colorant density limit for the medium at the constant heating power based on the printed test images that remain wet subsequent to exiting the radiant dryer.

21. A non-transitory computer readable medium embodying programmed instructions which, when executed by a processor communicatively coupled to a printing system, wherein the printing system includes a print engine that is operable to apply a colorant onto a continuous-form medium, and includes a radiant drier that is operable to apply heat to the medium based on a heating power, direct the processor to:
direct the print engine to print a plurality of test images onto the medium;
vary at least one of the heating power and a colorant density for each of the printed test images; and
determine whether each of the printed test images remains one of wet, dry, or over-dry subsequent to exiting the radiant dryer.

22. The non-transitory computer readable medium of claim 21 further comprising instructions that direct the processor to:
calculate an operational range of at least one of colorant densities and heating powers for the medium based on the determination.

23. The non-transitory computer readable medium of claim 22 further comprising instructions that direct the processor to:
determine a colorant limit for the medium based on the operational range of at least one of the colorant densities and the heating powers for a plurality of colorants utilized in forming a mixture.

24. The non-transitory computer readable medium of claim 22 further comprising instructions that direct the processor to:
determine a heating power limit for the medium based on the operational range of at least one of the colorant densities and the heating powers for a plurality of colorants utilized in forming a mixture.

25. The non-transitory computer readable medium of claim 21 further comprising instructions that direct the processor to:
receive data captured from a printed test image;
determine a difference between the data and reference data for the printed test image; and
determine whether the printed test image remains one of wet, dry, or over-dry based on the difference.

26. The non-transitory computer readable medium of claim 25 further comprising instructions that direct the processor to:
determine that the difference between the data and the reference data indicates at least one of smearing, show-through, and offsetting is present in the printed test image; and
determine that the printed test image remains wet based on the difference.

27. The non-transitory computer readable medium of claim 25 further comprising instructions that direct the processor to:
- determine that the difference between the data and the reference data indicates burning is present in the medium; and
- determine that the printed test image is over-dry based on the difference.

28. The non-transitory computer readable medium of claim 25 wherein:
- the data captured from the printed test image comprises spectral data.

29. The non-transitory computer readable medium of claim 21 further comprising instructions that direct the processor to:
- direct the print engine to print the plurality of test images onto the medium each having a common colorant and a common colorant density;
- vary the heating power for each of the printed test images; and
- determine a heating power limit for the medium at the common colorant density based on the printed test images that remain over-dry subsequent to exiting the radiant dryer.

30. The non-transitory computer readable medium of claim 21 further comprising instructions that direct the processor to:
- direct the print engine to print the plurality of test images onto the medium each having a common colorant and a different colorant density;
- apply a constant heating power to each of the printed test images; and
- determine a colorant density limit for the medium at the constant heating power based on the printed test images that remain wet subsequent to exiting the radiant dryer.

* * * * *